United States Patent
Gou et al.

(10) Patent No.: US 11,613,045 B2
(45) Date of Patent: Mar. 28, 2023

(54) CONTINUOUS EXTRUDER PROCESS FOR MANUFACTURING RHEOLOGY-MODIFIED POLYOLEFIN FOR CABLE INSULATION LAYER, AND RELATED PRODUCTS

(71) Applicant: Dow Global Technologies LLC, Midland, MI (US)

(72) Inventors: Qian Gou, Collegeville, PA (US); Neil W. Dunchus, Collegeville, PA (US); Bharat I. Chaudhary, Collegeville, PA (US)

(73) Assignee: Dow Global Technologies LLC, Midland, MI (US)

( * ) Notice: Subject to any disclaimer, the term of this patent is extended or adjusted under 35 U.S.C. 154(b) by 166 days.

(21) Appl. No.: 16/641,388

(22) PCT Filed: Aug. 27, 2018

(86) PCT No.: PCT/US2018/048057
§ 371 (c)(1),
(2) Date: Feb. 24, 2020

(87) PCT Pub. No.: WO2019/046149
PCT Pub. Date: Mar. 7, 2019

(65) Prior Publication Data
US 2020/0189166 A1      Jun. 18, 2020

Related U.S. Application Data

(60) Provisional application No. 62/551,973, filed on Aug. 30, 2017.

(51) Int. Cl.
*B29B 7/00* (2006.01)
*B29C 48/285* (2019.01)
(Continued)

(52) U.S. Cl.
CPC ............ *B29B 7/007* (2013.01); *B29C 48/022* (2019.02); *B29C 48/29* (2019.02); *B29C 48/297* (2019.02);
(Continued)

(58) Field of Classification Search
None
See application file for complete search history.

(56) References Cited

U.S. PATENT DOCUMENTS

| | | | |
|---|---|---|---|
| 2,930,083 A | | 3/1960 | Vostovich et al. |
| 5,068,047 A | * | 11/1991 | Chung ............... C08F 210/16 |
| | | | 525/327.7 |

(Continued)

FOREIGN PATENT DOCUMENTS

| | | |
|---|---|---|
| EP | 2468813 A1 | 6/2012 |
| WO | 2007/070121 A1 | 6/2007 |

OTHER PUBLICATIONS

Y. Kim et al., Polymer Journal, vol. 31, No. 7, 1999, pp. 579-584.
(Continued)

*Primary Examiner* — Timothy Kennedy
*Assistant Examiner* — Olukorede Esan
(74) *Attorney, Agent, or Firm* — Quarles & Brady LLP (57) ABSTRACT

Rheology-modified, additive-containing ethylenic polymer compositions are prepared in a continuously operated extruder comprising first, second and third zones by a process comprising the steps of: mixing in the second zone of the extruder an ethylenic polymer and a high-temperature decomposing peroxide at a temperature such that the half-life of the peroxide is equal to or greater than one minute and for a sufficient period of time to modify the rheology of the ethylenic polymer to produce a rheology-modified, melted ethylenic polymer for transfer to the third zone of the extruder; and adding to the third zone one or more additives
(Continued)

Extrusion Process Setup for CE1: Pre-blended materials were fed into the main hopper at zone 1 (barrel 1) and the peroxide was injected from the middle of zone 2 (barrel 4).

to the rheology-modified, melted ethylenic polymer to produce the rheology-modified, additive-containing ethylenic polymer.

19 Claims, 1 Drawing Sheet

(51) Int. Cl.
*B29C 48/00* (2019.01)
*B29C 48/36* (2019.01)
*B29C 48/78* (2019.01)
*C08J 3/20* (2006.01)
*C08K 5/14* (2006.01)
*B29C 48/29* (2019.01)
*B29K 23/00* (2006.01)

(52) U.S. Cl.
CPC ............ *B29C 48/363* (2019.02); *B29C 48/78* (2019.02); *C08J 3/201* (2013.01); *C08K 5/14* (2013.01); *B29K 2023/0625* (2013.01); *B29K 2023/0633* (2013.01); *C08J 2323/06* (2013.01); *C08J 2323/08* (2013.01)

(56) References Cited

U.S. PATENT DOCUMENTS

| | | |
|---|---|---|
| 5,246,783 A | 9/1993 | Spenadel et al. |
| 5,272,236 A | 12/1993 | Lai et al. |
| 5,278,272 A | 1/1994 | Lai et al. |
| 5,605,937 A | 2/1997 | Knaus |
| 5,614,592 A | 3/1997 | van Drunen et al. |
| 5,716,574 A | 2/1998 | Kawasaki |
| 5,763,498 A | 6/1998 | Knaus |
| 5,986,028 A | 11/1999 | Lai et al. |
| 6,187,423 B1 | 2/2001 | Maeger et al. |
| 6,395,791 B1 | 5/2002 | Chaudhary et al. |
| 6,496,629 B2 | 12/2002 | Ma et al. |
| 6,714,707 B2 | 3/2004 | Rossi et al. |
| 7,355,089 B2 | 4/2008 | Chang et al. |
| 7,504,347 B2 | 3/2009 | Poon et al. |
| 7,514,517 B2 | 4/2009 | Hoenig et al. |
| 7,524,911 B2 | 4/2009 | Karjala et al. |
| 7,579,408 B2 | 8/2009 | Walton et al. |
| 7,582,716 B2 | 9/2009 | Liang et al. |
| 9,058,918 B2 | 6/2015 | Caronia et al. |
| 2011/0094772 A1 | 4/2011 | Caronia et al. |
| 2011/0266027 A1 | 11/2011 | Pham et al. |
| 2015/0267036 A1 | 9/2015 | Cree |
| 2015/0291823 A1* | 10/2015 | Fu ................... H01B 9/006 428/375 |
| 2016/0304650 A1 | 10/2016 | Read et al. |
| 2017/0101528 A1 | 4/2017 | Person et al. |
| 2017/0361543 A1* | 12/2017 | Bergman .............. B29C 48/05 |

OTHER PUBLICATIONS

M. Lachtermacher et al., Journal of Applied Polymer Science, vol. 58, 1995, pp. 2077-2094.
P. Ghosh, et al., Polymer, vol. 38, No. 25, 1997, pp. 6175-6180.
H.B Parmar, et al., Polym. Eng. Sci., 49:1806-1813, 2009.
M. Lachtermacher et al., Journal of Applied Polymer Science, vol. 59 (1996), pp. 1775-1785.
Fusheng Yu et al., Analysis of structural properties and applications of olefin polymers, pp. 177-179, Beijing University of Technology Press, Aug. 31, 2012.

* cited by examiner

Figure 1. Extrusion Process Setup for CE1: Pre-blended materials were fed into the main hopper at zone 1 (barrel 1) and the peroxide was injected from the middle of zone 2 (barrel 4).

Figure 2. Extrusion Process Setup for CE2: Pre-blended materials were fed into the main hopper at zone 1 (barrel 1) and the peroxide was injected from the beginning of zone 2 (barrel 2).

Figure 3. Extrusion Process Setup for IE1: 96wt% polymer resins were fed into the main hopper at zone 1 (barrel 1); the remaining resins and additives were pre-blended and fed into the side feeder at the beginning of zone 3 (barrel 6) and the peroxide was injected from the beginning of zone 2 (barrel 2).

CONTINUOUS EXTRUDER PROCESS FOR MANUFACTURING RHEOLOGY-MODIFIED POLYOLEFIN FOR CABLE INSULATION LAYER, AND RELATED PRODUCTS

FIELD OF THE INVENTION

This invention relates to the rheology modification of a polyolefin. In one aspect the invention relates to a continuous extruder process for the rheology modification of a polyolefin while in another aspect, the invention relates to use of the process to manufacture crosslinked polyolefin insulation layers for medium to extra-high voltage power cables.

BACKGROUND OF THE INVENTION

The crosslinked insulation layers of medium- to extra-high voltage power cables are made using polyolefin compositions, e.g., ethylenic polymer compositions, that contain high-temperature decomposing peroxides. These formulations are required to exhibit low-shear viscosities at extrusion temperatures of 135° C. to 140° C. (to prevent shear-heating, which can lead to premature decomposition of peroxide) combined with sufficiently high zero-shear or low-strain extensional viscosities at these temperatures (for sag-resistance prior to crosslinking in a continuous vulcanization tube).

However, several of the ethylenic polymers (particularly elastomers made with molecular catalysts, such as metallocene or post-metallocene catalysts) that are of interest for making flexible electrical insulation compositions are linear polymers of relatively narrow molecular weight distributions which shear-thin poorly during extrusion, such that only those of high molecular weights (high shear viscosities) provide adequate sag-resistance. Rheology modification of ethylenic polymers (through the use of coupling agents such as peroxides) to improve shear and extensional viscosity characteristics is known, but the separate unit operation required to do so results in prohibitively increased manufacturing cost.

SUMMARY OF THE INVENTION

In one embodiment the invention is a one-unit operation, continuous extrusion process for making a rheology-modified, additive-containing ethylenic polymer in a continuously operated multi-zone extruder sequentially comprising a first zone configured with a main feeder for adding a polymer into the extruder and optionally configured with an injector for adding a high-temperature decomposing peroxide into the first zone of the extruder, a second zone optionally configured with an injector for adding a high-temperature decomposing peroxide into the second zone of the extruder, a third zone configured with a side feeder for adding one or more additives into the third zone of the extruder, and an outlet for discharging material from the extruder, wherein the first zone is in material communication with the second zone via 0, 1 or more intermediary zones disposed therebetween, wherein the second zone is in material communication with the third zone via 0, 1 or more intermediary zones disposed therebetween, and wherein the third zone is in material communication with the outlet via 0, 1 or more intermediary zones disposed therebetween, and wherein at least one of the first and second zones is configured with the injector, the process comprising the steps of:

mixing in the second zone of the extruder an ethylenic polymer and a high-temperature decomposing peroxide at a temperature such that the half-life of the peroxide is equal to or greater than ($\geq$) one minute and for a sufficient period of time to melt the ethylenic polymer and to modify the rheology of the melted ethylenic polymer to produce a rheology-modified, melted ethylenic polymer that is transferred to the third zone of the extruder; and adding via the side feeder of the third zone one or more additives to the rheology-modified, melted ethylenic polymer to produce the rheology-modified, additive-containing ethylenic polymer.

In one embodiment the invention is an insulation sheath for a power cable made by the inventive process. In one embodiment the invention is a power cable comprising an insulation sheath made by the inventive process. In one embodiment the power cable is a medium, high or extra-high voltage power cable. In one embodiment the invention is a method of conducting electricity by applying a voltage across the conductive core of the cable comprising the insulation sheath made by the inventive process, thereby causing electricity to flow through the conductive core.

One hallmark of the process of this invention is that the additives are not fed to the continuously operated extruder until after the ethylenic polymer has been rheology modified. Another hallmark of the process is the use of one or more high-temperature decomposing peroxides.

The continuous extrusion process of this invention is cost-effective; it reduces, if not eliminates, crosslinking interference from the additives; it reduces, if not eliminates, additive loss, e.g., antioxidants added early in the extrusion process (before the commencement of crosslinking) are often depleted before the rheology-modified composition is extruded); and the resulting compositions are suitable for making insulation and other layers for all low, medium, high and extra-high voltage power cables, particularly medium, high and extra-high voltage power cables.

DETAILED DESCRIPTION OF THE PREFERRED EMBODIMENT

Definitions

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranged containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

Unless stated to the contrary, implicit from the context, or customary in the art, all parts and percents are based on weight and all test methods are current as of the filing date of this disclosure.

"Composition" and like terms mean a combination of two or more materials. With the respective to the ethylenic polymers used in the practice of this invention, a composition is the ethylenic polymer in combination with one or more other materials, e.g., peroxide, antioxidant, stabilizer, water tree retardant, filler, another polymer, etc.

"Blend", "polymer blend" and like terms mean an intimate physical mixture (that is, without reaction) of two or more materials, e.g., two or more polymers, or a polymer and one or more additives, etc. A blend may or may not be miscible (not phase separated at the molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more materials on the macro level (for example, melt blending resins or compounding) or the micro level (for example, simultaneous forming within the same reactor two or more polymers).

"Melt blending" is a process whereby at least two components are combined or otherwise mixed together, and at least one of the components is in a melted state. The melt blending may be accomplished by way of batch mixing, extrusion blending, extrusion molding, and any combination thereof.

"Rheology-modified ethylenic polymer" and like terms mean an ethylenic polymer in which some of the individual molecules of the bulk polymer have coupled together. "Bulk polymer" refers to the polymer as formed in a reactor, i.e., a collection of individual polymer molecules. Not all individual molecules of a bulk polymer are alike in all respects, e.g., length, monomer sequence, functionality, etc. Rheology-modified ethylenic polymers are distinguished from ethylenic polymers that have not been rheology modified, i.e., the starting or pre-modified ethylenic polymer or, in other words, an ethylenic polymer that has not been contacted with a high-temperature decomposing peroxide under conditions that activate the peroxide, by one or more of the following test methods: Dynamic Oscillatory Shear Viscosity, Extensional Viscosity, and/or Zero Shear Viscosity. Rheology-modified ethylenic polymers have a gel content (insoluble fraction) of less than (<) 40%, or <30%, or <20%, or <10%, or <5%, or <1%, as measured by extracting the ethylenic polymer with decahydronaphthalene (decalin) according to ASTM D2765.

"Crosslinked ethylenic polymer" and like terms mean an ethylenic polymer that comprises a gel content (insoluble fraction) of equal to or greater than ($\geq$) 40%, or $\geq$50%, or $\geq$60%, or $\geq$70%, as measured by extracting the ethylenic polymer with decahydronaphthalene (decalin) according to ASTM D2765.

"Polymer" and like terms mean a macromolecular compound prepared by reacting (i.e., polymerizing) monomers of the same or different type. "Polymer" includes homopolymers and interpolymers. Trace amounts of impurities, for example, catalyst residues, may be incorporated into and/or within the polymer. The term also embraces all forms of copolymer, e.g., random, block, etc. Although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers are referred to has being based on "units" that are the polymerized form of a corresponding monomer.

"Interpolymer" means a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Ethylenic polymer", "ethylene-based polymer," "ethylene polymer," "polyethylene" and like terms mean a polymer that contains equal to or greater than 50 weight percent (wt %), or a majority amount, of polymerized ethylene based on the weight of the polymer, and, optionally, may comprise one or more comonomers. The generic term "ethylene-based polymer" thus includes ethylene homopolymer and ethylene interpolymer. These terms include an ethylenic polymer with polar functionality including (but not limited to) alkoxysilane groups.

"Macromolecule" and like terms mean a molecule containing a very large number of atoms, such as a polymer. Most ethylenic polymers are considered macromolecules.

The term "(meth)acrylate" includes acrylate, methacrylate, and a combination thereof. The (meth)acrylate may be unsubstituted.

"Sheath" is a generic term and when used in relation to cables, it includes insulation coverings or layers, protective jackets, and the like.

"Wire" is a single strand of conductive metal, e.g., copper or aluminum, or a single strand of optical fiber.

"Cable" and like terms mean an elongated object comprising at least one conductor, e.g., wire, optical fiber, etc., within a protective jacket or sheath. Typically, a cable is two or more wires or two or more optical fibers bound together in a common protective jacket or sheath. Combination cables may contain both electrical wires and optical fibers. The individual wires or fibers inside the jacket or sheath may be bare, covered or insulated. Typical cable designs are illustrated in U.S. Pat. Nos. 5,246,783; 6,496,629; and 6,714,707.

"Power cable", "electrical cable" and like terms mean an assembly of one or more electrical conductors, e.g., copper or aluminum wire, usually held together with an overall sheath. The assembly is used for transmission of electrical power. Power cables are generally divided into low voltage which are those cables rated for use at less than 5K volts, medium voltage which are those cables rated for use in a range from 5K volts to less than 35K volts, high voltage which are those cables rated for use in a range from 35K to less than 138K volts, and extra-high voltage which are those cables rated for use at or above 138K volts.

"Neat" and like terms mean solitary, or unmixed, or undiluted. A neat polymer is a polymer without additives or catalyst (other than those present in its "as produced" form). A neat polymer may be a blend of polymers.

"One-unit operation" and like terms mean a process performed in a single vessel, e.g., an extruder. A one-unit operation may comprise one or more steps and if comprised of one or more steps, all the steps are performed within the single vessel. Steps performed outside of the single vessel, e.g., pre-mixing of an additive package, are not part of the one-unit operation.

"Room temperature" and like terms mean 23° C. at atmospheric pressure.

"Ambient conditions" and like terms mean 23° C. and atmospheric pressure.

Ethylenic Polymer

The ethylenic polymers used in the practice of this invention can be branched, linear, or substantially linear, and can be made by any polymerization or copolymerization process, e.g., solution, gas phase, slurry, high pressure, etc. Representative of branched ethylenic polymers is low density polyethylene (LDPE) which is typically made by a high pressure, gas phase process and is characterized by extensive long chain branching. As used herein, the term "high-pressure reactor" or "high-pressure process" is any reactor or process operated at a pressure of at least 5000 pounds per square inch (psi) (34.47 megaPascal or MPa).

Representative of linear ethylenic polymers is linear low density polyethylene (LLDPE) which is typically made in a low pressure process and is characterized by an absence of long chain branching. The process is typically gas or solution phase depending upon the monomer that is copolymerized with ethylene, e.g., butene and hexene are typically (but not the only monomers) copolymerized with ethylene in a gas phase process while octene is typically (but not the only monomer) copolymerized with ethylene in a solution phase process.

Representative of substantially linear ethylenic polymers (SLEP) is substantially linear polyethylene which is typically made in a solution process and is characterized in part by having a backbone that is substituted with 0.01 to 3 long-chain branches per 1,000 carbon atoms. In some embodiments, the ethylenic polymer can have a backbone that is substituted with 0.01 to 1 long-chain branches per 1,000 carbon atoms, or from 0.05 to 1 long-chain branches per 1,000 carbon atoms.

The ethylenic polymers used in the practice of this invention are made using olefin polymerization catalysts that include Ziegler-Natta catalysts, chrome catalysts, and molecular catalysts. Ziegler-Natta (Z-N) catalysts such as TiCl4/MgCl2 and chrome catalysts such as a chromium oxide/silica gel are heterogeneous in that their catalytic sites are not derived from a single molecular species. Heterogeneous catalysts produce polyolefins with broad molecular weight distributions (MWD) and broad chemical composition distributions (CCD). A molecular catalyst is homogeneous in that it theoretically has a single catalytic site that is derived from a ligand-metal complex molecule with defined ligands and structure. As a result, molecular catalysts produce polyolefins with narrow CCD and narrow MWD, approaching but in practice not reaching the theoretical limit of Mw/Mn=2. Metallocenes are molecular catalysts that contain unsubstituted cyclopentadienyl ligands (Cp). Post-metallocene are derivatives of metallocenes that contain one or more substituted CP ligands, such as constrained geometry catalysts, or are non-sandwich complexes. Examples of post-metallocene catalysts are bis-phenylphenoxy catalysts, constrained geometry catalysts, imino-amido type catalysts, pyridyl-amide catalysts, imino-enamido catalysts, aminotroponiminato catalysts, amidoquinoline catalysts, bis(phenoxy-imine) catalysts, and phosphinimide catalysts.

In one embodiment of the invention, the ethylenic polymer is made in a solution process using a Ziegler-Natta, metallocene and/or constrained geometry catalyst. In one embodiment, the ethylenic polymers are ethylene-octene copolymers made by a solution process.

The ethylenic polymers used in the practice of this invention include both homopolymers and interpolymers, and if an interpolymer, then both random and blocky interpolymers. The ethylene polymer comprises at least 50, preferably at least 60 and more preferably at least 80, wt % of units derived from ethylene. The other units of the ethylenic polymer, if an interpolymer, are typically derived from one or more polymerizable monomers including (but not limited to) α-olefins and unsaturated carboxylic esters.

The α-olefin is preferably a C3-20 linear, branched or cyclic α-olefin. Examples of C3-20 α-olefins include propene, 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, particularly 5-ethylidene-2-norbornene, are α-olefins and can be used in place of some or all of the α-olefins described above. Similarly, styrene and its related olefins (for example, α-methylstyrene, etc.) are α-olefins for purposes of this invention. Illustrative ethylenic interpolymers include copolymers of ethylene/propylene, ethylene/butene, ethylene/1-hexene, ethylene/1-octene, ethylene/styrene, and the like. Illustrative ethylenic terpolymers include ethylene/propylene/1-octene, ethylene/propylene-/butene, ethylene/butene/1-octene, ethylene/propylene/diene monomer (EPDM) and ethylene/butene/styrene.

The unsaturated carboxylic ester may have hydrogen atoms and from 3 to 20 carbon atoms per molecule, i.e., be a ($C_3$-$C_{20}$)unsaturated carboxylic ester. In an embodiment, the ethylene/unsaturated carboxylic ester copolymer comprises from 51 to 99.0 wt % ethylenic monomer units and from 49 to 1.0 wt % unsaturated carboxylic ester monomer units.

In some aspects the unsaturated carboxylic ester may be a vinyl ($C_2$-$C_8$)carboxylate and the ethylene/unsaturated carboxylic ester copolymer is an ethylene-vinyl ($C_2$-$C_8$) carboxylate copolymer, which may have a vinyl ($C_2$-$C_8$) carboxylate monomer content from >0 to <3.5 wt %, alternatively from >0 to 3.0 wt %, alternatively from >0 to 2.0 wt %, alternatively from 0.5 to 2.0 wt % based on total weight of the ethylene-vinyl ($C_2$-$C_8$) carboxylate copolymer. In some aspects the vinyl ($C_2$-$C_8$)carboxylate is a vinyl ester of a carboxylic acid anion having from 2 to 8 carbon atoms, alternatively 2 to 4 carbon atoms. The vinyl ($C_2$-$C_8$)carboxylate may be a vinyl ($C_2$-$C_4$)carboxylate such as vinyl acetate, vinyl propionate, or vinyl butanoate and the ethylene/unsaturated carboxylic ester copolymer may be an ethylene-vinyl ($C_2$-$C_4$)carboxylate bipolymer, alternatively an ethylene-vinyl acetate (EVA) bipolymer, alternatively an ethylene-vinyl propionate bipolymer, alternatively an ethylene-vinyl butanoate bipolymer. The EVA bipolymer consists essentially of ethylene-derived monomer units and vinyl acetate-derived monomer units. The vinyl acetate monomer unit content of the EVA bipolymer may be from >0 to <3.5 wt %, alternatively from >0 to 3.0 wt %, alternatively from >0 to 2.0 wt %, alternatively from 0.5 to 2.0 wt % based on total weight of the EVA bipolymer. The wt % values are on average per molecule of the EVA.

In some aspects the unsaturated carboxylic ester used to make the ethylene/unsaturated carboxylic ester copolymer may be a ($C_1$-$C_8$)alkyl (meth)acrylate and the ethylene/unsaturated carboxylic ester copolymer is an ethylene-($C_1$-$C_8$)alkyl (meth)acrylate copolymer (EAA), which may have a ($C_1$-$C_8$)alkyl (meth)acrylate monomer content from >0 to <3.5 wt %, alternatively from >0 to 3.0 wt %, alternatively from >0 to 2.0 wt %, alternatively from 0.5 to 2.0 wt %, based on total weight of the ethylene-($C_1$-$C_8$)alkyl (meth)acrylate copolymer. In some aspects the ($C_1$-$C_8$)alkyl may be a ($C_1$-$C_4$)alkyl, ($C_5$-$C_8$)alkyl, or ($C_2$-$C_4$)alkyl. The EAA consists essentially of ethylene-derived monomer units and one or more different types of ($C_1$-$C_8$)alkyl (meth)acrylate-derived monomer units such as ethyl acrylate and/or ethyl methacrylate monomer units. The ($C_1$-$C_8$)alkyl may be methyl, ethyl, 1,1-dimethylethyl, butyl, or 2-ethylhexyl. The (meth)acrylate may be acrylate, methacrylate, or a combination thereof. The ($C_1$-$C_8$)alkyl (meth)acrylate may be ethyl acrylate and the EAA may be ethylene-ethyl acrylate copolymer (EEA) or the ($C_1$-$C_8$)alkyl (meth)acrylate may be ethyl methacrylate and the EAA may be ethylene-ethyl methacrylate copolymer (EEMA). The ethyl acrylate or ethyl methacrylate monomer unit content of EEA or EEMA, respectively, may independently be from >0 to <3.5 wt %, alternatively from >0 to 3.0 wt %, alternatively from >0 to 2.0 wt %, alternatively from 0.5 to 2.0 wt % based on total weight of the EEA or EEMA bipolymer.

Examples of ethylenic polymers useful in the practice of this invention include high density polyethylene (HDPE); medium density polyethylene (MDPE); linear low density polyethylene (LLDPE); low density polyethylene (LDPE); homogeneously branched, linear ethylene/α-olefin copolymers (e.g. TAFMER™ by Mitsui Petrochemicals Company Limited and EXACT™ by DEX-Plastomers); homogeneously branched, substantially linear ethylene/α-olefin polymers (e.g., AFFINITY™ polyolefin plastomers available from The Dow Chemical Company); and ethylene block copolymers (INFUSE™ also available from The Dow Chemical Company). The substantially linear ethylene copolymers are more fully described in U.S. Pat. Nos. 5,272,236, 5,278,272 and 5,986,028, and the ethylene block copolymers are more fully described in U.S. Pat. Nos. 7,579,408, 7,355,089, 7,524,911, 7,514,517, 7,582,716 and 7,504,347.

The ethylenic polymers have a density in the range of 0.850 to 0.965, or 0.860 to 0.945, or 0.870 to 0.925, g/cc as measured by ASTM D-792.

The ethylenic polymers have a melt index ($I_2$) before rheology modification in the range of 1 to 50 decigrams per minute (dg/min), or 2 to 30 dg/min, or 3 to 25 dg/min. $I_2$ is determined under ASTM D-1238, Condition E and measured at 190° C. and 2.16 kg.

The ethylenic polymers have a molecular weight distribution (MWD or Mw/Mn) before rheology modification of equal to or greater than (≥) 2.0, or ≥2.3, or ≥2.5, to equal to or less than (≤) 15.0, or ≤10.0, or ≤5.0. MWD is calculated or measured as described in the Test Methods of the Examples.

Peroxide

The high-temperature decomposing peroxide free radical initiators used in the practice of this invention for rheology-modification have a high decomposition temperature, i.e., they have half-life temperatures for one and ten hours of equal to or greater (≥) than 155° C. and 135° C., respectively, measured in dodecane or decane. Mixtures of two or more high-temperature decomposing peroxides can be used. The peroxide can be organic or inorganic, and it can be liquid or solid at room temperature.

Suitable peroxides include, but are not limited to, the dialkyl peroxides and diperoxyketal initiators. These compounds are described in the Encyclopedia of Chemical Technology, 3rd edition, Vol. 17, pp 27-90 (1982). In the group of dialkyl peroxides, nonlimiting examples include dicumyl peroxide, di-t-butyl peroxide, t-butyl cumyl peroxide, 2,5-dimethyl-2,5-di(t-butylperoxy)-hexane, 2,5-dimethyl-2,5-di(t-amylperoxy)-hexane, 2,5-dimethyl-2,5-di(t-butylperoxy)hexyne-3, 2,5-dimethyl-2,5-di(t-amylperoxy)hexyne-3, α,α-di[(t-butylperoxy)-isopropyl]-benzene, di-t-amyl peroxide, 1,3,5-tri-[(t-butylperoxy)-isopropyl] benzene, 1,3-dimethyl-3-(t-butylperoxy)butanol, 1,3-dimethyl-3-(t-amylperoxy)butanol and mixtures of two or more of these initiators.

In the group of diperoxyketal initiators, nonlimiting examples include: 1,1-di(t-butylperoxy)-3,3,5-trimethylcyclohexane, 1,1-di(t-butylperoxy)cyclohexane n-butyl, 4,4-di(t-amylperoxy)valerate, ethyl 3,3-di(t-butylperoxy)butyrate, 2,2-di(t-amylperoxy)propane, 3,6,6,9,9-pentamethyl-3-ethoxycarbonylmethyl-1,2,4,5-tetraoxacyclononane, n-butyl-4,4-bis(t-butylperoxy)-valerate, ethyl-3,3-di(t-amylperoxy)-butyrate and mixtures of two or more of these initiators.

The amount of high-temperature decomposing peroxide used in the practice of this invention for rheology-modification can vary with the minimum amount being sufficient to afford the desired range of coupling. The minimum amount of high-temperature decomposing peroxide for rheology-modification is typically at least about 0.02 wt %, or at least about 0.05 wt %, or at least about 0.1 wt % based upon the total weight of the rheology-modified, additive containing ethylenic polymer blend. The maximum amount of high-temperature decomposing peroxide for rheology-modification can vary, and it is typically determined by such factors as cost, efficiency and degree of desired coupling. The maximum amount is typically less than 1.5 wt %, or less than 1.3 wt %, or less than 1.0 wt %, or less than 0.8 wt %, based upon the total weight of the rheology-modified, additive containing ethylenic polymer blend.

For making the high temperature decomposing peroxide-containing composition that comprises the rheology-modified, additive containing ethylenic polymer blend made by the inventive process, the minimum amount of high-temperature decomposing peroxide is typically at least about 1.4 wt %, or at least about 1.5 wt %, or at least about 1.6 wt % based upon the total weight of the high-temperature decomposing peroxide-containing composition, and the maximum amount is typically less than 15 wt %, or less than 10 wt %, or less than 5 wt %, or less than 3 wt %, based upon the total weight of the high-temperature decomposing peroxide-containing composition.

In one embodiment of the invention, a peroxide other than a high-temperature decomposing peroxide is used in combination with a high-temperature decomposing peroxide. These non-high temperature decomposing peroxides can be added at any point in the process, e.g., pre-mixed with the ethylenic polymer prior to its feed to the extruder, in one or more zones of the extruder, etc., and they can be added neat or in combination with one or more other materials (e.g., polymer, additive, etc.). The amount and timing of the addition of these non-high temperature decomposing peroxides is such as not to interfere in any significant manner with the rheology modification of the ethylenic polymer prior to the addition of any additives. One purpose of the use of any such non-high temperature decomposing peroxide is to promote the ultimate crosslinking of the extruded polymer.

Additives

The additives used in the practice of this invention include, but are not limited to, antioxidants, stabilizers (including UV absorbers), water tree retardants, electrical tree retardants, crosslinking co-agents, cure boosters, scorch retardants, processing aids, coupling agents, antistatic agents, nucleating agents, slip agents, lubricants, viscosity control agents, tackifiers, anti-blocking agents, surfactants, extender oils, acid scavengers, flame retardants and metal deactivators. These additives are typically used in a conventional manner and in conventional amounts, e.g., from greater than zero, or 0.001, or 0.01, wt % to equal to or less than 30, or 20, or 10, or 1, wt % based on the total weight of the rheology-modified, additive containing ethylenic polymer blend or peroxide-containing composition.

Suitable UV light stabilizers include hindered amine light stabilizers (HALS) and UV light absorber (UVA) additives. Representative UV absorber (UVA) additives include benzotriazole types such as TINUVIN™ 326 and TINUVIN™ 328 commercially available from BASF. Blends of HALS and UVA additives are also effective.

Examples of antioxidants include hindered phenols such as tetrakis[methylene(3,5-di-tert-butyl-4-hydroxyhydro-cinnamate)]methane; bis[(beta-(3,5-ditert-butyl-4-hydroxybenzyl)methyl-carboxyethyl)]-sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)-hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and di stearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha, α-dimethylbenzyl)diphenyl-amine, diphenyl-p-phenylenediamine, mixed di-aryl-p-phenylenediamines, and other hindered amine anti-degradants or stabilizers.

Examples of processing aids include but are not limited to metal salts of carboxylic acids such as zinc stearate or calcium stearate; fatty acids such as stearic acid, oleic acid, or erucic acid; fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; nonionic surfactants; silicone fluids and polysiloxanes.

Tree retardant is a molecule that inhibits water and/or electrical treeing, or a collection of such molecules. The tree retardant may be a water tree retardant or electrical tree retardant. The water tree retardant is a compound that inhibits water treeing, which is a process by which polyolefins degrade when exposed to the combined effects of an electric field and humidity or moisture. The electrical tree retardant, also called a voltage stabilizer, is a compound that inhibits electrical treeing, which is an electrical pre-breakdown process in solid electrical insulation due to partial electrical discharges. Electrical treeing can occur in the absence of water. Water treeing and electrical treeing are problems for electrical cables that contain a coated conductor wherein the coating contains a polyolefin. The water tree retardant may be a poly(ethylene glycol) (PEG).

Process

The process of this invention is performed in an extruder. The process is a multi-step, unit operation meaning that all steps of the process are performed in association with the extruder, i.e., feeding materials to the extruder, processing of the materials within the extruder, and discharging processed material from the extruder. Ancillary steps to the inventive process, e.g., preparation of materials fed to the extruder, collection and treatment of product extruded from the extruder, etc., are not part of the unit operation.

Extruders are well known in the art, and any of the many and varied extruders commercially available can be used in the practice of this invention. Illustrative but nonlimiting examples of extruders include continuous single, or twin screw, extruders, such as a COPERION™ W&P ZSK-30 mm, co-rotating, intermeshing twin screw extruder; a FARREL™ continuous extruder; a WERNER and PFLEIDERERTM™ twin screw extruder; or a BUSS™ kneading continuous extruder. The extruder typically comprises multiple zones in which polymer and other materials are conveyed, melted and mixed, and pumped (i.e., extruded). Each zone can comprise one or more subzones (also known as "barrels") typically distinguished from one another by the structure of the screw(s), e.g., the screw(s) of the melting and mixing zone can comprise sections of gear mixing elements, kneading blocks, and reverse flight elements. The extruder is typically equipped with multiple feed ports, e.g., separate ports for polymer, peroxide, additives, etc. The extruder can be equipped with an external heating and/or cooling elements. Extruder design (e.g., overall length, length to diameter ratio (L/D), number and size of barrels, etc.), the screw design and the number of screws, placement of feed ports along the length of extruder, etc., can vary to convenience with the proviso that the additives port is positioned after the resin and peroxide ports.

In the operation of the process, solid ethylenic polymer is fed to the extruder, typically into the first barrel of the first zone. In one embodiment the polymer is fed neat, i.e., the ethylenic polymer is added without any other component or ingredient of the process, e.g., without any additive, peroxide, etc. A neat ethylenic polymer can comprise, however, two or more ethylenic polymers. The shape and size of the solid can vary, e.g., pellet, flake, etc. In one embodiment the polymer is fed in combination with a peroxide, preferably a high-temperature decomposing peroxide.

In one embodiment the peroxide is added to the ethylenic polymer before the polymer is fed to the extruder, e.g., the peroxide is sprayed onto, soaked into, or otherwise mixed with the polymer, outside of the extruder. This mixing of polymer and peroxide outside of the extruder is not part of the one-unit operation. In one embodiment the ethylenic polymer and peroxide are added separately or simultaneously to the extruder, and this is part of the one-unit operation. In one embodiment the peroxide is added to a melted ethylenic polymer. In one embodiment the peroxide is added to an unmelted ethylenic polymer.

Other than when the peroxide is mixed with the ethylenic polymer before the addition of the polymer to the extruder, the peroxide is neat when fed to the extruder although this term does not exclude the addition of two or more peroxides. Typically the peroxide(s) is(are) high-temperature decomposing peroxide(s) although one or more non-high temperature decomposing peroxides can also be added. Typically the peroxide is fed to the extruder and onto the ethylenic polymer before the polymer is melted. In one embodiment, the peroxide is fed to the extruder through a port positioned typically from 0 to 9 L/D units, more typically from 0 to 6 L/D units, downstream from the polymer feed port. Typically both the ethylenic polymer and the peroxide are fed to the first zone of the extruder. In this zone the blending of the polymer and peroxide begins. This early blend is then transferred to the second zone of the extruder in which the polymer and peroxide are fully melt blended and rheology modification begins.

In one embodiment the peroxide is first fed to the extruder in the second zone. The polymer into which the peroxide is mixed can be solid, partially solid or melted (i.e., in transition from unmelted to fully melted), or fully melted. In one embodiment, one or both of additional polymer or peroxide are fed to the second zone. "Additional" means that the polymer or peroxide added in the second zone is over and above that added in the first zone. The mix of polymer and peroxide in the second zone of the extruder is subjected to melt blending through the action of the screws. Sufficient heat is generated, typically from the shear imparted to the mix by the screws and, optionally, provided from an external heat source, so as to decompose the high-temperature decomposing peroxide and initiate rheology modification, but not crosslinking, of the polymer.

After the blend of ethylenic polymer and peroxide is melt blended, the high-temperature decomposing peroxide decomposed, and coupling or rheology modification initiated or completed, additives are fed to the extruder through a third port positioned downstream of the peroxide feed port. The amount of rheology modification or coupling is measured by values of V0.1/V100 (135° C.) and zero shear viscosity from dynamic oscillatory shear (135° C.). The additives are typically fed as a complete pre-mixed blend although one or more can be added neat, or as combinations of two or more additives, through separate feed ports. The additives fed to the extruder can comprise a carrier resin, typically, but not necessarily, the resin that is fed to the extruder through the resin feed port. If the additives are not added as a complete package through a single port, then the sequence in which the additives are added can vary to convenience.

The additive port is typically positioned from 12 to 24 L/D units, more typically from 12 to 18 L/D units, downstream from the peroxide port or if the peroxide is fed to the extruder through the polymer feed port, then from 12 to 24 L/D units, more typically from 12 to 18 L/D units, downstream from the polymer feed port. In one embodiment in which the extruder comprises at least three zones, the polymer feed port is positioned in the first zone, the peroxide feed port in the second zone, and the additive feed port in the third zone.

As noted above, the rheology of the starting ethylenic polymer, in melt form, is modified by the activation within the extruder of the high-temperature decomposing peroxide with which it is contact. The relative extent of rheology modification may be characterized by the Dynamic Oscillatory Shear Viscosity Test Method (preferred) and/or the Extensional Viscosity Test Method and/or Zero Shear Viscosity Test Method, all described later in this disclosure. The comparison is made, of course, between the ethylenic polymer either before or after contact with the high-temperature decomposing peroxide but before its activation, and the ethylenic polymer after the activation of the high-temperature decomposing peroxide. Typically the rheology-modified ethylenic polymer is sampled for testing after the high-temperature decomposing peroxide has completely decomposed, typically at or near the end of the second zone of the extruder. Complete, or near complete, decomposition of the high-temperature decomposing peroxide is a function of the residence time and melt temperature between the peroxide injector and side feeder and, in one embodiment, these are controlled by (i) screw design and/or (ii) increasing the barrel temperatures or screw speed or both. Typically the desired degree of rheology modification of the ethylenic polymer is achieved within 2 to 20, or 4 to 15, or 6 to 10, half-lives of the peroxide in the polymer at a given melt mixing temperature.

The extent of thermally irreversible bonds formed between molecules of the starting bulk ethylenic polymer to give the rheology-modified ethylenic polymer is measurably less than the extent of thermally irreversible bonds formed between molecules of the rheology-modified ethylenic polymer to give a crosslinked ethylenic polymer product. This difference may be characterized by the Gel Content Test Method, described later in this disclosure. In general, the higher the gel content the greater the extent of thermally irreversible bonds formed between molecules, and vice versa. The rheology-modified ethylenic polymer may have a gel content (insoluble fraction) of from 0% to less than (<) 40%, alternatively from 0% to <30%, alternatively from 0% to <20%, alternatively from 0% to <10%, alternatively from 0% to <5%, alternatively from 0% to <1%, alternatively from greater than (>) 0% to less than (<) 40%, alternatively from >0% to <30%, alternatively from >0% to <20%, alternatively from >0% to <10%, alternatively from >0% to <5%, alternatively from >0% to <1%. In some aspects the rheology-modified ethylenic polymer may have a minimum gel content of 0%, alternatively 0.01%, alternatively 0.05%, alternatively 0.1%. The crosslinked ethylenic polymer product may have a gel content (insoluble fraction) of from greater than or equal to (≥) 40% to 100%, alternatively from ≥50% to 100%, alternatively from ≥60% to 100%, alternatively from ≥70% to 100%, alternatively ≥40% to <100%, alternatively from ≥50% to <100%, alternatively from ≥60% to <100%, alternatively from ≥70% to <100%. In some aspects the crosslinked ethylenic polymer product may have a maximum gel content of 99%, alternatively 95%, alternatively 90%. The foregoing gel contents are characterized by the Gel Content Test Method.

The process of this invention produces a rheology-modified ethylenic composition suitable to make a peroxide-containing composition for extrusion as an insulation sheath of a low, medium, high or extra-high voltage power cable, particularly for a medium, high or extra-high voltage power cable. The extruded peroxide-containing composition exhibits adequate sag resistance, very low, if any, gels (gel content by decalin extraction typically less than 1 wt %), and good color (preferably white, and not yellow, if no colorant is intentionally employed). These properties are achieved notwithstanding that various additives, particularly antioxidants, are known to interfere with the crosslinking of ethylenic polymers. Hallmarks of the invention include its multistep unit operation, the use of peroxides with a high decomposition temperature, and decomposing the peroxide and initiating rheology modification prior to the addition of additives.

EMBODIMENTS

In one embodiment the process of this invention comprises the further steps of:
  feeding via the main feeder a solid form of a first ethylenic polymer into the first zone of the continuously operated multi-zone extruder to place the first ethylenic polymer within the first zone of the continuously operated multi-zone extruder; and
  melting and transporting the first ethylenic polymer within the extruder to produce the melted ethylenic polymer in the second zone of the extruder.

In one embodiment the ethylenic polymer is fed neat to the first zone of the extruder.

In one embodiment the ethylenic polymer fed to the first zone of the extruder includes a peroxide.

In one embodiment the ethylenic polymer fed to the first zone of the extruder includes a high-temperature decomposing peroxide.

In one embodiment a high-temperature decomposing peroxide is fed to the first zone of the extruder via the main feeder.

In one embodiment the high-temperature decomposing peroxide is fed to the first zone via an injector.

In one embodiment the mixing of the ethylenic polymer and peroxide in the first zone of the extruder begins before the ethylenic polymer is melted.

In one embodiment the process of this invention comprises the further step of:
  adding via the injector the high-temperature decomposing peroxide to the melted ethylenic polymer in the second zone of the extruder.

In one embodiment the process of this invention comprises the further steps of:
  mixing the rheology-modified, melted ethylenic polymer and the one or more additives together to form a blend thereof in the extruder, and
  extruding from the outlet of the extruder the blend of the rheology-modified, melted ethylenic polymer and the one or more additives to give an extruded form of the blend.

In one embodiment the first and second zones are in material communication with one another without any intervening intermediary zones, i.e., the number of intermediary zones is zero (0).

In one embodiment the extrusion apparatus comprises: (1) a main feeder at barrel one of zone 1 through which 90 to 100 wt % of ethylenic polymer is fed to the extruder, (2) an injector through which the high-temperature decomposing peroxide is injected, and (3) a side feeder through which all additives and 0 to 10 wt % of the ethylenic polymer is fed.

In one embodiment (A) the main feeder is located at barrel 1 of zone 1, (B) the peroxide injector is located on any barrel (including barrel 1 of zone 1) before the first kneading section (located in either zone 1 or zone 2 of the extruder), and (C) the length between the peroxide injector and the side feeder is at least 3 L/D to ensure enough residence time for rheology modification.

In one embodiment the melting temperature is at least 185° C. and the residence time is equal to at least 3 to 5 times the half-life of the high-temperature decomposing peroxide at the melt temperature in the injection zone between the peroxide injector and the side feeder.

In one embodiment the invention is a one-unit operation, continuous extrusion process for making a rheology-modified, additive-containing ethylenic polymer in a continuously operated multi-zone extruder sequentially comprising a first zone configured with a main feeder for adding a polymer into the extruder and optionally configured with an injector for adding a high-temperature decomposing peroxide into the first zone of the extruder, a second zone optionally configured with an injector for adding a high-temperature decomposing peroxide into the second zone of the extruder, a third zone configured with a side feeder for adding one or more additives into the third zone of the extruder, and an outlet for discharging material from the extruder, wherein the first zone is in material communication with the second zone via 0, 1 or more intermediary zones disposed therebetween, wherein the second zone is in material communication with the third zone via 0, 1 or more intermediary zones disposed therebetween, and wherein the third zone is in material communication with the outlet via 0, 1 or more intermediary zones disposed therebetween, and wherein at least one of the first and second zones is configured with the injector, the process comprising the steps of:

(A) feeding via the main feeder a solid form of a neat ethylenic polymer into the first zone of a continuously operated multi-zone extruder to place the neat ethylenic polymer within the first zone of the continuously operated multi-zone extruder, (B) melting and transporting the neat ethylenic polymer within the extruder to give a melted ethylenic polymer in the second zone of the extruder, (C) adding via an injector a high-temperature decomposing peroxide to the melted ethylenic polymer in the second zone of the extruder to give the high-temperature decomposing peroxide in contact with the melted ethylenic polymer in the second zone of the extruder, (D) mixing and transporting the peroxide with the melted ethylenic polymer at a temperature such that the half-life of the peroxide coupling agent is equal to or greater than ($\geq$) one minute and for a sufficient period of time to modify the rheology of the melted ethylenic polymer to give a rheology-modified, melted ethylenic polymer in the third zone of the extruder, (E) adding via the feeder one or more additives to the rheology-modified, melted ethylenic polymer to give the one or more additives in contact with the rheology-modified, melted ethylenic polymer in the third zone of the extruder, (F) mixing the rheology-modified, melted ethylenic polymer and the one or more additives together to form a blend thereof in the extruder, and (G) extruding from the outlet of the extruder the blend of the rheology-modified, melted ethylenic polymer and the one or more additives to give an extruded form of the blend.

In one embodiment the inventive process can comprise a combination of two or more embodiments as described herein.

The following examples further illustrate the invention. Unless otherwise stated, all parts and percentages are by weight. Table 1 shows the properties of the polymers employed in making the compositions.

EXAMPLES

Test Methods

Density is measured according to ASTM D-792.

Melt index, or $I_2$, is measured in accordance with ASTM D1238, condition 190° C./2.16 kg, and is reported in grams eluted per 10 minutes.

Molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by T. Williams & I. M. Ward, *The Construction of a Polyethylene Calibration Curve for Gel Permeation Chromatography Using Polystyrene Fractions*, 6 J. Polymer Sci. Pt. B: Polymer Letter 621, 621-624 (1968)) to derive the following equation:

$$M_{polyethylene} = a \times (M_{polystyrene})^b$$

In this equation, a=0.4316 and b=1.0.

Number average molecular weight, $M_n$, of a polymer is expressed as the first moment of a plot of the number of molecules in each molecular weight range against the molecular weight. In effect, this is the total molecular weight of all molecules divided by the number of molecules and is calculated in the usual matter according to the following formula:

$$M_n = \Sigma n_i \times M_i / \Sigma n_i = \Sigma w_i / \Sigma(w_i/M_i)$$

where $n_i$=number of molecules with molecular weight $M_i$, $w_i$=weight fraction of material having molecular weight $M_i$, and $\Sigma n_i$=total number of molecules.

Weight average molecular weight, $M_w$, is calculated in the usual manner according to the following formula: $M_w = \Sigma w_i \times M_i$, where $w_i$ and $M_i$ are the weight fraction and molecular weight, respectively, of the $i^{th}$ fraction eluting from the GPC column.

The ratio of these two averages, the polydispersity index (PDI) or molecular weight distribution (MWD or $M_w/M_n$), defines the breadth of the molecular weight distribution.

Dynamic Oscillatory Shear Viscosity Test Method (V0.1/V100 at 135° C. and V100 at 135° C. (Pa·s)) is conducted over a range from 0.1 radian per second (rad/s, "V0.1") to 100 rad/s ("V100") using a TA Instruments Advanced Rheometric Expansion System at a temperature of 135° C. and 0.25% strain, representative of insulation layer extrusion conditions. V0.1 and V100 are the viscosities at 0.1 rad/s and 100 rad/s, respectively, and the ratio V0.1/V100 is a measure of shear thinning characteristics. Measured viscosity in pascal-seconds (Pa·s). Test specimen is taken from an unaged compression molded plaque prepared by Compression Molding Method 1.

Extensional Viscosity Test Method (Extensional Viscosity at 135° or 150° C., 1/s, Hencky strain of 0.2, 0.5, or 1 (Pa·s); Maximum Extensional Viscosity at 135° or 150° C., 1/s (Pa·s); and Hencky Strain corresponding to Max. Ext. Viscosity at 135° or 150° C., 1/s): is measured using an ARES FCU Rheometer with Extensional Viscosity Fixture Geometry and TA Orchestrator Software. Conduct the test at a rate of 1 per second at 135° or 150° C. to simulate extrusion conditions. Report the maximum viscosity value (peak) attained, the maximum Hencky strain attained, and viscosities at Hencky Strains of 0.2, 0.5 and 1. Test specimen is taken from an unaged compression molded plaque prepared by Compression Molding Method 1. Measured in poise and converted to kilopascal-seconds (kPa·s), wherein 100,000 poise=10.0 kPa·s.

Zero Shear Viscosity (Zero Shear Viscosity at 135° C. (Pa·s)) is deduced from the Dynamic Oscillatory Shear Viscosity Test Method or is measured from creep recovery using SR-200, 25.0 Pascals, 3 minutes creep, 15 minutes recovery, 135° C. Test specimen is an unaged compression molded plaque prepared by Compression Molding Method 1.

Compression Molding Method 1 is used to prepare test samples for melt rheological measurements. Samples are compression molded at the following conditions to prevent significant crosslinking due to the decomposition of one or more of the peroxides: 500 pounds per square inch (psi) (3.5 MPa) at 120° C. for 3 minutes, followed by 2500 psi (17 MPa) at 120° C. for 3 minutes, cooling to 30° C. at 2500 psi (17 MPa), and opening the press to remove the resulting molded plaque.

Gel Content Test Method is used to measure crosslinking. The test measures gel content (insoluble fraction) by extracting the crosslinked ethylenic polymer with decahydronaphthalene (decalin) according to ASTM D2765.

Half-Life Temperature Test Method: Half-life temperature is measured on a solution of organic peroxide at a concentration of 0.1 Molar (M) in dodecane with monitoring of heat flux of decomposition of organic peroxide by differential scanning calorimetry-thermal activity monitoring (DSC-TAM) and compared relative to heat flux of pure dodecane. The heat emitted by the solution is directly related to the organic peroxide concentration [P]. The 1-hour half-life temperature is the measure of thermal energy at which 50 percent (50.0 percent) of the organic peroxide is decomposed after 60 minutes (60.0 minutes) of heating at that temperature. The 10-hour half-life temperature is the measure of thermal energy at which 50 percent (50.0 percent) of the organic peroxide is decomposed after 600 minutes (600.0 minutes) of heating at that temperature. The 1-hour half-life temperature is greater than the 10-hour half-life temperature. The greater the 1-hour or 10-hour half-life temperature of an organic peroxide, the greater the stability of the peroxide in the test method, and the greater the stability of the organic peroxide in the polyolefin formulation.

Inventive Example 1 (IE1) and Comparative Examples 1 and 2 (CE1 and CE2)

The compositions are shown in Table 1.

Developmental product number XUS 38661.00 is a molecular catalyst-made ethylene-octene elastomeric copolymer of 0.880 g/cc density (ASTM D792) and 18 g/10 min melt index (ASTM D1238), available from The Dow Chemical Company.

The peroxide is LUPEROX™ 101 peroxide (high-temperature decomposing peroxide with half-life temperatures for 1 hr and 10 hr of 140.3° C. and 120.3° C., measured in dodecane).

Figure 1:
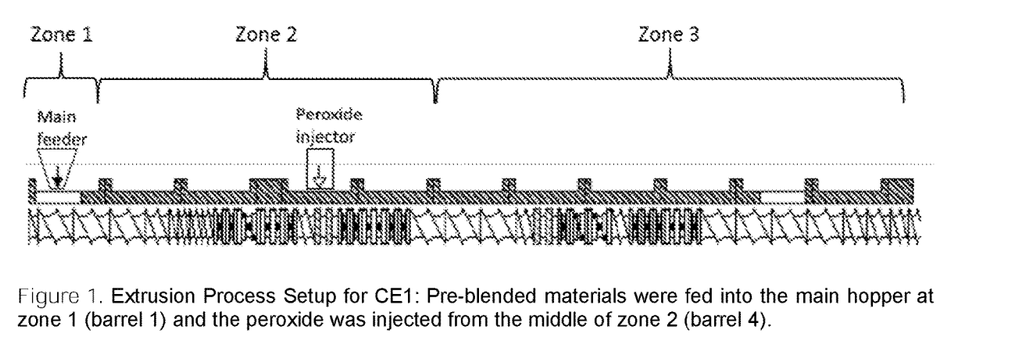
FIG. 1 is a schematic illustration of the extruder used in comparative example 1. Polymer and all additives are fed into the extruder through the main hopper at barrel 1 of zone 1, melt blended in barrels 2 and 3 of zone 2, and the peroxide is added at barrel 4 of zone 2.
Figure 2:
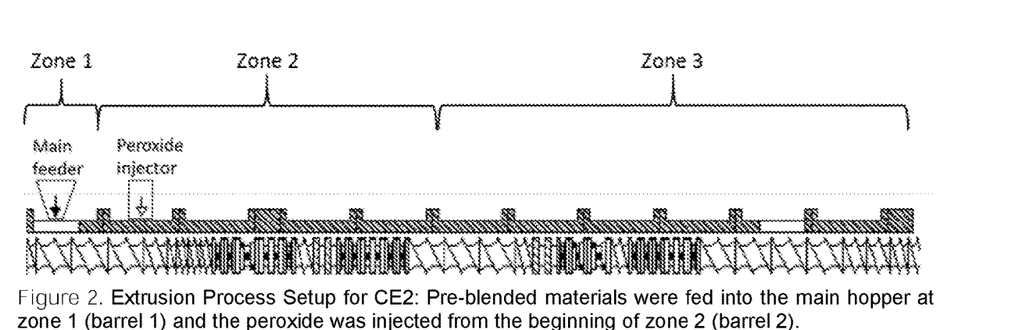
FIG. 2 is a schematic illustration of the extruder used in comparative example 2. Polymer and all additives are fed into the extruder through the main hopper at barrel 1 of zone 1, and peroxide is added at barrel 2 of zone 2 before any significant melt blending of the polymer and additives.
Figure 3:
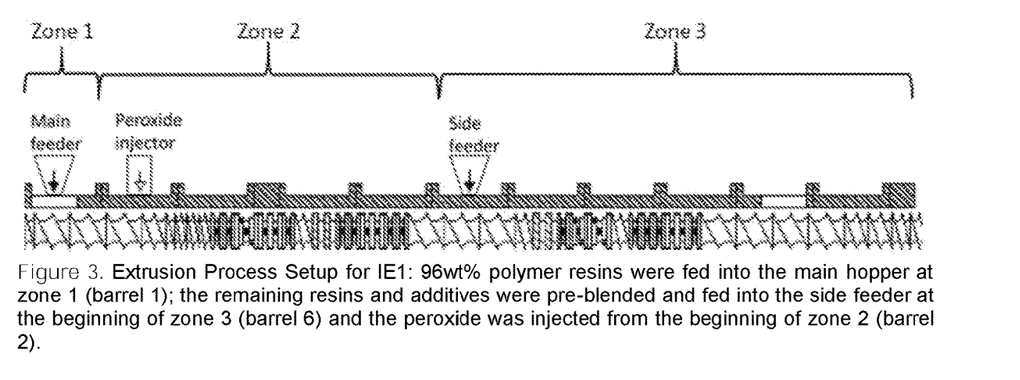
FIG. 3 is a schematic illustration of the extruder used in inventive example 1. Ninety-six percent (96%) of the polymer is added at barrel 1 of zone 1 and all of the peroxide is added at barrel 2 of zone 2. The polymer and peroxide are melt blended, and the polymer rheology-modified over barrels 3-5 of zone 2. All of the additives and the remaining four percent (4%) of the polymer are added at barrel 6 of zone 3.

The compositions are compounded in a COPERION™ W&P ZSK-30 mm co-rotating, intermeshing twin screw extruder with a GALA™ underwater pelletizer. The twin screw extruder consists of 11 barrels and the length to diameter ratio (L/D) is 35:1. All the examples use the same screw configuration (see FIGS. 1-3). Comparative Example 1 is produced using the process setup shown in FIG. 1, where all the components are pre-blended in a drum tumbler for at least 15 minutes and fed into the main hopper at barrel 1 while the peroxide is injected at barrel 4. Comparative Example 2 is produced using the process setup shown in FIG. 2, where all the components are pre-blended in a drum tumbler for at least 15 minutes and fed into the main hopper at barrel 1 while the peroxide is injected at barrel 2. Inventive Example 1 is made using the process setup shown in FIG. 3, where 98.0% of the polymer is fed into the main hopper at barrel 1, the remaining components including 2.0% of the polymer and all of the other additives are pre-blended in a drum tumbler for at least 15 minutes and fed into the side feeder at barrel 6 while the peroxide is injected at barrel 2.

The processing conditions for the examples are listed in Table 1.

The screw speed for IE1 is higher than those for CE1 and CE2. Also, the temperatures for barrels 1, 2, and 3 in the case of IE1 are higher than CE1 and CE2. The combination of high screw speed and high barrel temperatures increases the melting temperature in the later stage of zone 2 (barrels 3-5) before all of the other additives are fed into the system at barrel 6.

The properties of the compositions are given in Table 1.

In the dynamic oscillatory shear test conducted at the temperature of 135° C., IE1 exhibits enhanced melt shear-thinning characteristics relative to CE1 and CE2, as evidenced from the values of V0.1/V100. Increased zero shear viscosity at 135° C. is also observed with IE1, in comparison with CE1 and CE2. Also, the pellet colors of CE1 and CE2 are yellow, while the pellet color of IE1 is desirably white. This observation indicates that the peroxide has fully decomposed and modified the polymer in IE1 before the other additives are incorporated, unlike in the case of CE1 and CE2.

TABLE 1

Compositions, Processing Conditions, and Properties of CE1, CE2, and IE1

|  | CE1 1 | CE2 2 | IE1 3 |
|---|---|---|---|
| Composition (wt %) | | | |
| XUS 38661.00 polyolefin elastomer | 98.04 | 98.04 | 97.94 |
| PEG 20000 (Clariant POLYGLYKOL ™ 20000 SRU) | 0.92 | 0.92 | 0.92 |
| LOWINOX ™ TBM-6 | 0.53 | 0.53 | 0.53 |
| LUPEROX ™ 101 Peroxide | 0.51 | 0.51 | 0.61 |
| Total | 100.00 | 100.00 | 100.00 |
| Processing Conditions | | | |
| Screw Speed, rpm | 325 | 225 | 445 |
| Total Feed Rate, lb/hr | 50 | 50 | 50 |
| Screen pack | 20/100/20 | 20/150/20 | 20/70/20 |
| Zone 1 temperature condition | | | |
| Temperature for Barrel 1, ° C. | 120 | 120 | 140 |
| Zone 2 temperature condition | | | |
| Temperature for Barrels 2 and 3, ° C. | 170 | 150 | 220 |
| Temperature for Barrels 4 and 5, ° C. | 215 | 220 | 220 |

TABLE 1-continued

Compositions, Processing Conditions, and Properties of CE1, CE2, and IE1

|  | CE1 1 | CE2 2 | IE1 3 |
|---|---|---|---|
| Zone 3 temperature condition | | | |
| Temperature for Barrels 6 and 7, ° C. | 215 | 220 | 220 |
| Temperature for Barrels 8 and 9, ° C. | 215 | 220 | 220 |
| Temperature for Barrels 10 and 11, ° C. | 215 | 220 | 220 |
| Die temperature condition | | | |
| Temperature for Die, ° C. | 180 | 170 | 170 |
| Extrusion Process Setup | Main feeder + 4$^{th}$ port liquid injection | Main feeder + 2$^{nd}$ port liquid injection | Main and side feeders + 2$^{nd}$ port liquid injection |
| Properties | | | |
| V0.1/V100 (135° C.) | 11.3 | 6.02 | 23.6 |
| V100 at 135° C. (Pa s) | 672 | 442 | 771 |
| Zero Shear Viscosity at 135° C. (Pa s) - Dynamic Oscillatory Shear | 10500 | 8550 | 111000 |
| Pellets Color | Yellow | Yellow | White |

POLYGLYKOL ™ 20000 SRU is a polyethylene glycol with a mean molecular weight of 20000. It is a solid in flake form, and it is available from Clariant.
LOWINOX ™ TBM-6 is 4,4'-thiobis(2-t-butyl-5-methylphenol). It acts as an antioxidant and is available from Addivant.

Inventive Examples 2 to 4 (IE2 to IE4) and Comparative Examples 3 to 6 (CE3 to CE6)

The polymers are: Developmental product number XUS 38661.00, a molecular catalyst-made ethylene-octene elastomeric copolymer of 0.880 g/cc density (ASTM D792) and 18 g/10 min melt index (ASTM D1238), available from The Dow Chemical Company, and DOW™ LDPE 6211 (low density polyethylene available from The Dow Chemical Company) of 0.920 g/cc density (ASTM D792) and 2.3 g/10 min melt index (ASTM D1238).

The peroxide is LUPEROX™ 101 peroxide (high-temperature decomposing peroxide with half-life temperatures for 1 hr and 10 hr of 140.3° C. and 120.3° C., measured in dodecane).

The compositions are compounded using the same screw configuration and process setup as those used for IE1. For CE3 to CE6 and IE2, 98.0% of the polymer is fed into the main hopper at barrel 1; the remaining components including 2.0% of the polymer and additives are pre-blended in a drum tumbler for at least 15 minutes and fed into the side feeder at barrel 6. For IE3, 97.7% of XUS 38661.00 resin is fed into the main hopper at barrel 1; the remaining components including 2.3% of XUS 38661.00 resin and all of the other additives (including DOW™ LDPE 6211 resin) are pre-blended in a drum tumbler for at least 15 minutes and fed into the side feeder at barrel 6. For IE4, 97.9% of the polymer is fed into the main hopper at barrel 1; the remaining components including 2.1% of the polymer and all of the other additives (including calcined clay) are pre-blended in a drum tumbler for at least 15 minutes and fed into the side feeder at barrel 6.

The processing conditions for the examples are listed in Table 2. The screw speeds for IE2 to IE5 are higher than those for CE3 to CE6. Also, the temperatures for barrels 1, 2, and 3 in the case of IE2 to IE5 are higher than CE3 to CE5. The combination of high screw speed and high barrel temperatures increased the melting temperature in the later stage of zone 2 (barrels 3-5) before all of the other additives are fed into the system from barrel 6.

The properties of the compositions are given in Table 2. The dynamic oscillatory shear test is conducted at 135° C., and the composition of IE2 exhibits enhanced melt shear-thinning characteristics relative to the compositions of CE3 to CE6, as evidenced from the values of V0.1/V100. Increased zero shear viscosity at 135° C. is also observed with the composition of IE2 in comparison with the compositions of CE3 to CE6. The low peroxide levels in the compositions of CE2 and CE3 in combination with low melting temperatures (low screw speeds and low barrel temperatures) yield relatively low rheology modification. In the case of the composition of CE5, although enough peroxide level is added, the low screw speed and low barrel temperatures (barrel 1 to 3) lead to a low melting temperature at which the peroxide is not able to fully react with the polymer. For CE6, the composition and barrel temperature profile are the same as IE1, but it runs at low screw speed which again results in a low melting temperature. The inclusion of minor amounts of LDPE in the compositions results in further increases in zero-shear viscosity at 135° C., while a small amount of calcined clay did not have a large effect on melt rheological properties (IE3 to IE4 versus IE2).

Also, the pellet colors of the compositions of CE3 to CE6 are yellow, while the pellet colors of the compositions of IE2 to IE4 are desirably white. This observation indicates that the peroxide has fully decomposed and modified the polymer in IE2 to IE4 before the other additives are incorporated, unlike in the case of CE3 to CE6. The fully reacted peroxide in IE2 to IE4 can be attributed to the high melting temperature in the screw resulting from combination of high barrel temperatures and high screw speed.

TABLE 2

Compositions, Processing Conditions, and Properties of CE3 to CE6 and IE2 to IE4

| | CE3 1 | CE4 2 | CE5 3 | CE6 4 | IE2 5 | IE3 6 | IE4 7 |
|---|---|---|---|---|---|---|---|
| Composition (wt %) | | | | | | | |
| XUS 38661.00 polyolefin elastomer | 98.33 | 98.04 | 97.77 | 97.94 | 97.85 | 88.59 | 95.28 |
| LDPE 621i | | | | | | 9.26 | |
| TRANSLINK™ 37 Calcined Clay | | | | | | | 2.57 |
| PEG 20000 (Clariant POLYGLYKOL™ 20000 SRU) | 0.92 | 0.92 | 0.92 | 0.92 | 0.92 | 0.92 | 0.92 |
| LOWINOX™ TBM-6 | 0.53 | 0.53 | 0.53 | 0.53 | 0.53 | 0.53 | 0.53 |
| LUPEROX™ 101 Peroxide | 0.21 | 0.51 | 0.78 | 0.61 | 0.70 | 0.70 | 0.70 |
| Total | 100.00 | 100.00 | 100.00 | 100.00 | 100.00 | 100.00 | 100.00 |
| Processing Conditions | | | | | | | |
| Screw Speed, rpm | 325 | 325 | 345 | 260 | 445 | 445 | 445 |
| Total Feed Rate, lb/hr | 50 | 50 | 50 | 50 | 50 | 50 | 50 |
| Screen pack | 20/150/20 | 20/150/20 | 20/150/20 | 20/70/20 | 20/70/20 | 20/70/20 | 20/70/20 |
| Zone 1 temperature condition | | | | | | | |
| Temperature for Barrel 1, ° C. | 120 | 120 | 120 | 140 | 180 | 180 | 180 |
| Zone 2 temperature condition | | | | | | | |
| Temperature for Barrels 2 and 3, ° C. | 190 | 190 | 190 | 220 | 220 | 220 | 220 |
| Temperature for Barrels 4 and 5, ° C. | 220 | 220 | 220 | 220 | 220 | 220 | 220 |
| Zone 3 temperature condition | | | | | | | |
| Temperature for Barrels 6 and 7, ° C. | 220 | 220 | 220 | 220 | 220 | 220 | 220 |
| Temperature for Barrels 8 and 9, ° C. | 220 | 220 | 220 | 220 | 220 | 220 | 220 |
| Temperature for Barrels 10 and 11, ° C. | 220 | 220 | 220 | 220 | 220 | 220 | 220 |
| Die temperature condition | | | | | | | |
| Temperature for Die, ° C. | 170 | 170 | 170 | 170 | 170 | 170 | 170 |
| Extrusion Process Setup | Main and side feeders + $2^{nd}$ port liquid injection | | | | | | |
| Properties | | | | | | | |
| V0.1/V100 (135° C.) | 5.77 | 10.2 | 28.6 | 13.8 | 33.60 | 42.70 | 41.40 |
| V100 at 135° C. (Pa s) | 656 | 590 | 749 | 506 | 665 | 941 | 607 |
| Zero Shear Viscosity at 135° C. (Pa 5) - Dynamic Oscillatory Shear | 3170 | 7740 | 39100 | 29040 | 177187 | 397727 | 109289 |
| Pellets Color | Yellow | Yellow | Yellow | Yellow | White | White | White |

TRANSLINK™ 37 is a calcined and surface-treated aluminosilicates available from BASF.

Inventive Examples 5 to 7 (IE5 to IE7)

The compositions are shown in Table 3. The polymer is ENGAGE™ 7447 EL ethylene butene elastomeric copolymer of 0.865 g/cc density (ASTM D792) and 5 g/10 min melt index (ASTM D1238), available from The Dow Chemical Company.

The peroxide employed was LUPEROX™ 101 peroxide (high-temperature decomposing peroxide with half-life temperatures for 1 hr and 10 hr of 140.3° C. and 120.3° C., measured in dodecane).

The compositions are compounded using the same screw configuration and process setup as those used for IE1. For all the examples, 98.0% of the polymer is fed into the main hopper at barrel 1, and the remaining components including 2.0% of the polymer and all of the other additives are pre-blended in a drum tumbler for at least 15 minutes and fed into the side feeder at barrel 6.

The processing conditions for the examples are listed in Table 3. The processing conditions of temperature profiles, screw speed and total feed rate are the same for IE5, IE6 and IE7.

The properties of the compositions are given in Table 3.

The dynamic oscillatory shear test is conducted at 135° C., and the composition of IE7 exhibits enhanced melt shear-thinning characteristics relative to the compositions of IE5 and IE6 as evidenced from the values of V0.1/V100. Increased zero shear viscosity at 135° C. is also observed with the composition of IE7 in comparison with the compositions of IE5 to IE6. The peroxides in IE5 to IE7 are fully reacted before the other additives are incorporated as shown by their desirably white color.

TABLE 3

Compositions, Processing Conditions, and Properties of IE5, IE6, and IE7

|  | IE5 1 | IE6 2 | IE7 3 |
|---|---|---|---|
| Composition (wt %) | | | |
| ENGAGE ™ 7447 EL | 98.35 | 98.15 | 97.96 |
| PEG 20000 (Clariant POLYGLYKOL ™ 20000 SRU) | 0.92 | 0.92 | 0.92 |
| LOWINOX ™ TBM-6 | 0.53 | 0.53 | 0.53 |
| LUPEROX ™ 101 Peroxide | 0.20 | 0.40 | 0.60 |
| Total | 100.00 | 100.00 | 100.00 |
| Processing Conditions | | | |
| Screw Speed, rpm | 445 | 445 | 445 |
| Total Feed Rate, lb/hr | 40 | 40 | 40 |
| Screen pack | 20/70/20 | 20/70/20 | 20/70/20 |
| Zone 1 temperature condition | | | |
| Temperature for Barrel 1, ° C. | 168 | 168 | 168 |
| Zone 2 temperature condition | | | |
| Temperature for Barrels 2 and 3, ° C. | 220 | 220 | 220 |
| Temperature for Barrels 4 and 5, ° C. | 220 | 220 | 220 |
| Zone 3 temperature condition | | | |
| Temperature for Barrels 6 and 7, ° C. | 220 | 220 | 220 |
| Temperature for Barrels 8 and 9, ° C. | 220 | 220 | 220 |
| Temperature for Barrels 10 and 11, ° C. | 220 | 220 | 220 |
| Die temperature condition | | | |
| Temperature for Die, ° C. | 170 | 170 | 170 |
| Extrusion Process Setup | Main and side feeders + 2$^{nd}$ port liquid injection | | |
| Properties | | | |
| V0.1/V100 (135° C.) | 8.85 | 17.20 | 28.30 |
| V100 at 135° C. (Pa s) | 1020 | 1034 | 1005 |
| Zero Shear Viscosity at 135° C. (Pa s) - Dynamic Oscillatory Shear | 9884 | 63379 | 154473 |
| Pellets Color | White | White | White |

What is claimed is:

1. A one-unit operation, continuous extrusion process for making a rheology-modified, additive-containing ethylenic polymer in a continuously operated multi-zone extruder sequentially comprising a first zone configured with a main feeder for adding a polymer into the extruder, a third zone configured with a side feeder for adding one or more additives into the third zone of the extruder, and an outlet for discharging material from the extruder, wherein the first zone is in material communication with the second zone via 0, 1 or more intermediary zones disposed therebetween, wherein the second zone is in material communication with the third zone via 0, 1 or more intermediary zones disposed therebetween, and wherein the third zone is in material communication with the outlet via 0, 1 or more intermediary zones disposed therebetween, and wherein at least one of the first and second zones is configured with an injector for adding a high-temperature decomposing peroxide, the process comprising the steps of:

mixing in the second zone of the extruder an ethylenic polymer and a high-temperature decomposing peroxide having half-life temperatures for one and ten hours of equal to or greater (≥) than 155° C. and 135° C., respectively, as measured according to the Half-Life Temperature Test Method, at a temperature such that the half-life of the peroxide is equal to or greater than (≥) one minute and for a sufficient period of time to melt the ethylenic polymer and completely decompose all of the peroxide and to modify the rheology of the melted ethylenic polymer to produce a rheology-modified, melted ethylenic polymer that is transferred to the third zone of the extruder;

adding, after production of the rheology-modified, melted ethylene polymer, via the side feeder of the third zone one or more additives to the rheology-modified, melted ethylenic polymer to produce the rheology-modified, additive-containing ethylenic polymer; and forming pellets from the rheology-modified, additive containing ethylenic polymer, the pellets having a white color and a gel content greater than or equal to 40%.

2. The process of claim 1 comprising the further steps of feeding via the main feeder a solid form of a first ethylenic polymer into the first zone of the continuously operated multi-zone extruder to place the first ethylenic polymer within the first zone of the continuously operated multi-zone extruder; and melting and transporting the first ethylenic polymer within the extruder to produce the melted ethylenic polymer in the second zone of the extruder.

3. The process of claim 2 in which the first ethylenic polymer is a neat ethylenic polymer.

4. The process of claim 1 wherein the first zone of the extruder is configured with the injector for adding a high-temperature decomposing peroxide into the first zone of the extruder, and the process comprising the further step of:
feeding via the main feeder or through the injector of the first zone the high-temperature decomposing peroxide into the first zone of the continuously operated multi-zone extruder for contacting with the first ethylenic polymer.

5. The process of claim 1 wherein the second zone of the extruder is configured with the injector for adding a high-temperature decomposing peroxide into the second zone of the extruder, and the process comprising the further step of:
adding via the injector of the second zone the high-temperature decomposing peroxide to the ethylenic polymer in the second zone of the extruder.

6. The process of claim 1 comprising the further steps of:
mixing the rheology-modified, melted ethylenic polymer and the one or more additives together to form the rheology-modified, additive-containing ethylenic polymer as a blend of the rheology-modified, melted ethylenic polymer and the one or more additives in the extruder, and
extruding from the outlet of the extruder the blend of the rheology-modified, melted ethylenic polymer and the one or more additives to give an extruded form of the blend.

7. The process of claim 2 in which the first ethylenic polymer comprises substantially linear ethylene polymer macromolecules.

8. The process of claim 1 in which the high-temperature decomposing peroxide is one or more of a dialkyl peroxide and a diperoxyketal.

9. The process of claim 1 comprising the further step of adding one or more non-high-temperature decomposing peroxides.

10. The process of claim 1 in which the additives comprise one or more of an antioxidant, a UV-stabilizer, and a water-tree retardant.

11. The process of claim 1 wherein the rheology-modified, additive-containing ethylenic polymer comprises an insulation layer on a conductive core of a cable comprising the conductive core at least partially surrounded by the insulation layer.

12. The process of claim 6 further comprising curing the extruded form of the blend to give a crosslinked ethylenic polymer.

13. The process of claim 1 wherein the high-temperature decomposing peroxide is selected from the group consisting of dicumyl peroxide, di-t-butyl peroxide, t-butyl cumyl peroxide, 2,5-dimethyl-2,5-di(t-butylperoxy)-hexane, 2,5-dimethyl-2,5-di(t-amylperoxy)-hexane, 2,5-dimethyl-2,5-di(t-butylperoxy)hexyne-3, 2,5-dimethyl-2,5-di(t-amylperoxy)hexyne-3, a,adi[(t-butylperoxy)-isopropyl]-benzene, di-t-amyl peroxide, 1,3,5-tri-[(t-butylperoxy)-isopropyl] benzene, 1,3-dimethyl-3-(t-butylperoxy)butanol, 1,3-dimethyl-3-(tamylperoxy) butanol, 1,1-di(tbutylperoxy)-3,3,5-trimethylcyclohexane, 1,1-di(t-butylperoxy)cyclohexane n-butyl, 4,4-di(tamylperoxy)valerate, ethyl 3,3-di(t-butylperoxy)butyrate, 2,2-di(t-amylperoxy)propane, 3,6,6,9,9-pentamethyl-3-ethoxycarbonylmethyl-1,2,4,5-tetraoxacyclononane, n-butyl-4,4-bis(t-butylperoxy)-valerate, ethyl-3,3-di(t-amylperoxy)-butyrate and combinations thereof.

14. The process of claim 1 wherein the high-temperature decomposing peroxide is 2,5-dimethyl-2,5-di(t-butylperoxy)-hexane.

15. The process of claim 1 wherein the ethylenic polymer consists of (i) ethylene and (ii) a comonomer selected from the group consisting of a $C_3$-$C_{20}$ α-olefin and a $C_3$-$C_{20}$ unsaturated carboxylic acid ester.

16. The process of claim 1 wherein the ethylenic polymer consists of (i) ethylene and (ii) a comonomer selected from the group consisting of a $C_3$-$C_{20}$ α-olefin and a $C_3$-$C_{20}$ unsaturated carboxylic acid ester.

17. A one-unit operation, continuous extrusion process for making a rheology-modified, additive-containing ethylenic polymer in a continuously operated multi-zone extruder sequentially comprising a first zone configured with a main feeder for adding a polymer into the extruder, a second zone, a third zone configured with a side feeder for adding one or more additives into the third zone of the extruder, and an outlet for discharging material from the extruder, wherein the first zone is in material communication with the second zone via 0, 1 or more intermediary zones disposed therebetween, wherein the second zone is in material communication with the third zone via 0, 1 or more intermediary zones disposed therebetween, and wherein the third zone is in material communication with the outlet via 0, 1 or more intermediary zones disposed therebetween, and wherein at least one of the first and second zones is configured with the injector for adding a high-temperature decomposing peroxide, the process comprising the steps of:
mixing in the second zone of the extruder components consisting of (i) an ethylenic polymer and (ii) a high-temperature decomposing peroxide, at a temperature such that the half-life of the peroxide is equal to or greater than (≥) one minute and for a sufficient period of time to melt the ethylenic polymer and completely decompose all of the peroxide, and to modify the rheology of the melted ethylenic polymer to produce a rheology-modified, melted ethylenic polymer that is transferred to the third zone of the extruder;
adding, after production of the rheology-modified, melted ethylene polymer, via the side feeder of the third zone a component consisting of one or more additives to the rheology-modified, melted ethylenic polymer to produce the rheology-modified, additive-containing ethylenic polymer; and
forming pellets from the rheology-modified, additive containing ethylenic polymer, the pellets having a white color and a gel content greater than or equal to 40%.

18. The process of claim 17 wherein the ethylenic polymer consists of (i) ethylene and (ii) a comonomer selected from the group consisting of a $C_3$-$C_{20}$ α-olefin and a $C_3$-$C_{20}$ unsaturated carboxylic acid ester.

19. A one-unit operation, continuous extrusion process for making a rheology-modified, additive-containing ethylenic polymer in a continuously operated multi-zone extruder sequentially comprising a first zone configured with a main feeder for adding a polymer into the extruder, a third zone configured with a side feeder for adding one or more additives into the third zone of the extruder, and an outlet for discharging material from the extruder, wherein the first zone is in material communication with the second zone via 0, 1 or more intermediary zones disposed therebetween, wherein the second zone is in material communication with the third zone via 0, 1 or more intermediary zones disposed therebetween, and wherein the third zone is in material communication with the outlet via 0, 1 or more intermediary zones disposed therebetween, and wherein at least one of the first and second zones is configured with the injector for adding a high-temperature decomposing peroxide, the process comprising the steps of:

mixing in the second zone of the extruder an ethylenic polymer and a high-temperature decomposing peroxide at a temperature greater than or equal to 220° C. to the temperature at which the half-life of the peroxide is equal to or greater than (≥) one minute and for a sufficient period of time to melt the ethylenic polymer and completely decompose all of the peroxide, and to modify the rheology of the melted ethylenic polymer to produce a rheology-modified, melted ethylenic polymer that is transferred to the third zone of the extruder;

adding, after production of the rheology-modified, melted ethylene polymer, via the side feeder of the third zone one or more additives to the rheology-modified, melted ethylenic polymer to produce the rheology-modified, additive-containing ethylenic polymer; and forming pellets from the rheology-modified, additive containing ethylenic polymer, the pellets having a white color and a gel content greater than or equal to 40%.

\* \* \* \* \*